(12) United States Patent
Ogawa

(10) Patent No.: US 7,765,565 B2
(45) Date of Patent: Jul. 27, 2010

(54) CONTENT REPRODUCING APPARATUS, AND TELEVISION RECEIVING APPARATUS

(75) Inventor: Tetsuya Ogawa, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 459 days.

(21) Appl. No.: 11/730,724

(22) Filed: Apr. 3, 2007

(65) Prior Publication Data
US 2007/0245367 A1 Oct. 18, 2007

(30) Foreign Application Priority Data
Apr. 4, 2006 (JP) .............................. 2006-103199
Sep. 11, 2006 (JP) .............................. 2006-245534

(51) Int. Cl.
*H04N 7/16* (2006.01)
(52) U.S. Cl. ....................................................... 725/28
(58) Field of Classification Search .................. None
See application file for complete search history.

(56) References Cited

U.S. PATENT DOCUMENTS

| | | | |
|---|---|---|---|
| 4,554,584 A | | 11/1985 | Elam et al. |
| 5,945,988 A | * | 8/1999 | Williams et al. ............. 715/747 |
| 5,973,683 A | * | 10/1999 | Cragun et al. ................ 715/719 |
| 5,995,133 A | * | 11/1999 | Kim ............................. 725/28 |
| 6,100,916 A | * | 8/2000 | August et al. ................. 725/28 |
| 6,449,766 B1 | * | 9/2002 | Fleming ....................... 725/28 |
| 6,684,240 B1 | * | 1/2004 | Goddard ...................... 709/217 |

(Continued)

FOREIGN PATENT DOCUMENTS

JP     2000-184305 A     6/2000

(Continued)

*Primary Examiner*—Brian T Pendleton
*Assistant Examiner*—Ryan Stronczer
(74) *Attorney, Agent, or Firm*—Birch, Stewart, Kolasch & Birch, LLP

(57) ABSTRACT

A plurality of types of rating information are easily and reliably set. A television receiver A includes a receiver main body 1 and a remote controller 15 for controlling it. The receiver main body 1 includes a tuner unit 3, a signal processing unit 5, a display control unit 7 for controlling display, a display unit 11, a remote controller photoreception unit 17, a control unit 21 for overall control, a parental control unit 23 for controlling view, and a rating information storage unit 25 in which rating information is stored. In the rating information storage unit, tables relating to rating information 25 shown in Tables 1 to 9 are stored. In the television receiver A, based on an instruction from the control unit 21, the information in the tables can be referred to as needed. Tables indicating a plurality of types of rating information are stored in the rating information storage unit 25. The rating information storage unit 25 stores a plurality of types of rating information based on different standards regarding parental control, with items capable of being commonly set among the multiple types of rating information being associated with each other. The control unit 21 can set at once the common items based the association regarding age limitation. When a block for rating information concerning a viewed program is not yet set, and if the rating of a particular program is equal to or above the level set by the user based on another rating information, a message is displayed so as to alert the user to the broadcast of programs that are not desirable for children.

8 Claims, 15 Drawing Sheets

U.S. PATENT DOCUMENTS

| | | | |
|---|---|---|---|
| 6,922,843 B1 * | 7/2005 | Herrington et al. | 725/30 |
| 7,047,547 B2 * | 5/2006 | Alten et al. | 725/28 |
| 7,380,258 B2 * | 5/2008 | Durden et al. | 725/25 |
| 7,472,424 B2 * | 12/2008 | Evans et al. | 726/27 |
| 2003/0110488 A1 * | 6/2003 | Lee | 725/30 |
| 2003/0115592 A1 * | 6/2003 | Johnson | 725/28 |
| 2003/0163811 A1 * | 8/2003 | Luehrs | 725/25 |
| 2004/0068739 A1 * | 4/2004 | Russ et al. | 725/39 |
| 2005/0028191 A1 * | 2/2005 | Sullivan et al. | 725/28 |
| 2006/0143648 A1 * | 6/2006 | Shinokawa | 725/25 |
| 2007/0079340 A1 * | 4/2007 | McEnroe | 725/78 |

FOREIGN PATENT DOCUMENTS

| | | |
|---|---|---|
| JP | 2001-145033 A | 5/2001 |
| JP | 2001-251582 A | 9/2001 |
| JP | 2002-538686 A | 11/2002 |
| JP | 2003-517766 A | 5/2003 |
| JP | 2004-7514 A | 1/2004 |
| WO | WO-00/51351 A1 | 8/2000 |
| WO | WO-01/44905 A2 | 6/2001 |
| WO | WO-01/50751 A1 | 7/2001 |
| WO | WO-2004/100525 A2 | 11/2004 |
| WO | WO-2005/015914 A1 | 2/2005 |

* cited by examiner

STRUCTURE OF TSP

CONTENT REPRODUCING APPARATUS, AND TELEVISION RECEIVING APPARATUS

This application is based on the Japanese patent application 2006-103199, filed on Apr. 4 2006, and 2006-245534, filed on Sep. 11, 2006, all the contents of which are incorporated in this application by reference.

BACKGROUND OF THE INVENTION

1. Field of the Invention

The present invention relates to a content reproducing apparatus, and more particularly to content reproducing apparatus such as a television receiving apparatus having parental control (lock).

2. Background Art

With the diversification of society, broadcast programs have also become diversified. In an attempt to deal with such diversification, parental control technologies are being more frequently employed to put a cap on the age under which certain programs are prohibited from being viewed.

For example, a technology to exert control on parental control is proposed (see Patent Document 1) whereby, for programs for which no parental information is set on the part of the broadcasting station, the user sets condition information (channel number, time slots, genre, etc.) on the part of the digital broadcast receiving unit on an individual program basis. In another technology (see Patent Document 2), self-parental information is set in a parental information area that originally exists in each program, separately from the broadcaster's parental information, so that parental control can be set on an individual program basis without an associated increase in memory.

Patent Document 3 discloses another technology for limiting the watching of harmful programs, wherein ratings are set for undesirable programs and if the rating of a received program corresponds to a set rating, that program is prevented from being watched. This publication proposes a view control circuit called "V-Chip". With regard to such V-Chip parental control (lock) technology, Patent Document 4 discloses that applicable hours are set so that the parental control can be lifted to allow view without requiring the input of a password. Further, Patent Document 5 discloses a technology to cause a rating to be displayed on screen so as to allow the parents to quickly determine whether or not a program they are currently watching is desirable for themselves but not for children.

Patent Document 1: JP Patent Publication (Kokai) No. 2001-145033 A

Patent Document 2: JP Patent Publication (Kokai) No. 2004-7514 A

Patent Document 3: U.S. Pat. No. 4,554,584

Patent Document 4: JP Patent Publication (Kokai) No. 2001-251582 A

Patent Document 5: JP Patent Publication (Kokai) No. 2000-184305 A

SUMMARY OF THE INVENTION

However, in the technology according to Patent Document 1, the user has to make the necessary settings for each program, which is cumbersome. In the technology according to Patent Document 2, too, there is a similar problem.

None of Patent Documents 3 to 5 consider setting a plurality of types of rating information simultaneously. Therefore, if there are more than one type of rating information to be set, the user has to make the cumbersome setting by himself, which is the second problem.

Further, if one type of rating information is set but another type of rating information is not set, it may become possible for children, for example, to watch a program of the same rating level as the rating set for the former, which is the third problem.

It is therefore an object of the invention to provide a technology to allow individual users to exert parental control (lock) flexibly in a manner adapted to each user, while reducing the amount of operation to be made by the user.

It is another object of the invention to provide a technology to allow the user to set a plurality of types of rating information simply and accurately.

Regarding the first problem, in accordance with the invention, viewer age is determined from the content name or content information or the like in a content reproducing apparatus such as a television receiver having a parental control (lock), and if there is no parental information in the content or if the program can be rated for ages higher than the intended age in its existing parental information, parental control setting is made on the basis of the age determined from a keyword, for example, contained in the content information, and parental control is imposed according to such settings. Thus, parental control can be imposed simply by the age of the viewer. Thus, by determining parental information from the program name or program information and having the user set only the age, a decision can be made based on the parental information, and parental control can be imposed.

As to programs for which no parental information is set on the part of the broadcaster, in accordance with conventional technology, the user sets parental information by himself in order to set parental control. In accordance with the invention, on the other hand, an appropriate viewer age is determined from the program name, program information, and other information such as subtitles, and all the user has to do is to set the viewer age, so as to effect parental control.

With regard to the second problem, items that can be commonly set are added to the menu apart from the block setting for a plurality of types of rating information, and an age or a number is entered in order to make parental control settings for the multiple types of rating information simultaneously.

With regard to the third problem, when the (type of) rating information for a particular program to be viewed is not set for parental control, if another type of rating information is set and if the rating level of the program is equal to or higher than the set level, a message is displayed on the screen so as to let the user make sure if the program may be allowed to children.

In one aspect, the invention provides a television receiver capable of imposing parental control on a received program based on a rating that is set, the receiver including: a rating information storage unit in which a plurality of types of rating information based on different standards regarding parental control are stored; and a control unit for imposing parental control by referring to the rating information in the rating information storage unit.

Preferably, the control unit compares a first parental control information set by the user and a second parental control information set in a program, and imposes an actual parental control. When no parental control is set by a first rating information among the multiple types of rating information but parental control is set by a second rating information, if the rating level of a particular program is equal to or higher than the level set in the receiver, a message is displayed to that effect.

In another aspect, the invention provides a television receiver capable of imposing parental control on a received program based on a rating that is set, the receiver including: a rating information storage unit in which a plurality of types of rating information based on different standards regarding parental control are stored, with items capable of being commonly set among the plurality of types of rating information being associated with each other; and a control unit for setting at once the common items based on the association. The television receiver preferably includes a display control unit for adding the common items as items on a menu display. The common items may be associated with age, or a specific text string or numeral string. The display control unit may display on the menu display a button for setting parental control based on the rating information in a stepwise manner. When, among the plurality of types of rating information, no parental control setting is made in terms of first rating information but parental control is set in terms of second rating information, if the rating level of a particular program is equal to or higher than the level set in the receiver, a message may be displayed to that effect.

EFFECTS OF THE INVENTION

In accordance with the invention, by simply making an age setting, parental control can be imposed even on a program that does not include parental information by estimating the viewer age.

Further, in accordance with the invention, in a television receiver having a parental control (lock), when there are a plurality of types of rating information, they can be commonly set so as to reduce the amount of work to be expended by the user for setting purposes.

Further, in accordance with the invention, the user can make sure if a particular program should be allowed to children prior to viewing it.

Thus, the invention allows for an easy setting of parental control and makes sure that parents can watch television with children even if they forget to set some of the parental control settings.

DESCRIPTION OF THE PREFERRED EMBODIMENTS

Hereafter a television receiver according to an embodiment of the invention will be described with reference to the drawings. The television receiver of the present embodiment involves a processing technology used in a case where their settings are overlapping among a plurality of types of rating information.

Figure 1:
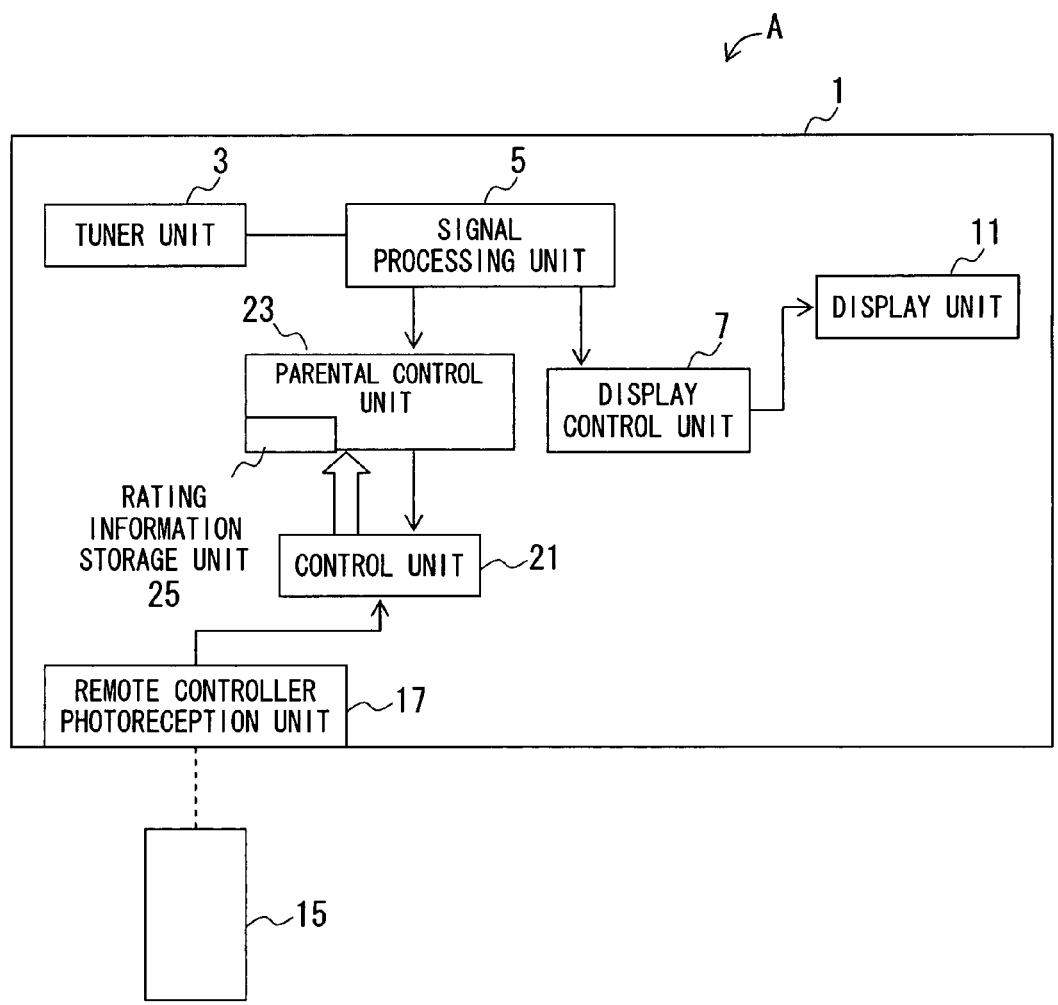
FIG. 1 shows a functional block diagram of a television receiver according to an embodiment of the invention.

FIG. 1 shows a functional block diagram of the television receiver according to the present embodiment. As shown, the television receiver A includes a receiver main body 1 and a remote controller 15 for controlling it. The receiver main body 1 includes a tuner unit 3, a signal processing unit 5, a display control unit 7 for display control, a display unit 11, a remote controller photoreception unit 17, an overall control unit 21, a parental control unit 23 for parental control, and a rating information storage unit 25 in which rating information is stored. In the rating information storage unit, tables 1 to 9 related to rating information 25 are stored, as will be described later. In this television receiver A, reference can be made to the information in tables 1 to 9 as needed based on an instruction from the control unit 21.

In the following, the television receiver of the present embodiment will be described with an emphasis on parental control technology. The below tables 1 to 9 are tables indicating a plurality of types of rating information having different standards regarding parental control. These tables are stored in the rating information storage unit 25. Such rating information, however, may not be stored within the television receiver A as long as it is accessible via the Internet.

The rating information storage unit 25 stores the types of rating information having different standards regarding parental control such that items capable of being set mutually among the multiple types of rating information are associated with each other. The control unit 21 is capable of setting such mutual items at once based on an association pertaining to age limitation. When the block for rating information about programs is not set, and if the rating of a particular program is equivalent to or higher than the level set by the user in terms of another rating information, a message can be displayed, for example, so that the user can be notified of a program that is not desirable to children In the following, a table of North American rating information is shown as an example of rating information.

TABLE 1

Rating information in North America

TV Parental Guideline Age-Based Rating for Children's Programs: For children TV-Y, TV-Y7
TV Parental Guideline Age-Based Rating for Entire Audience: For entire audience TV-G, TV-PG, TV-14, TV-MA
If the entered age is any of the following, parental control is imposed:

| | | |
|---|---|---|
| TV-Y | For all children | |
| TV-Y7 | Children age 7 and above | 0-6 FV |
| TV-G | For all ages. Also suitable for small children. | 7-13 |
| TV-PG | Not suitable for small children | 7-13 DLSV |
| TV-14 | Not suitable to age 13 and below | 7-13 DLSV |
| TV-MA | Not suitable to age 16 and below | 14-16 LSV |

Age 0-6: Block TV-MA to TV-Y7 (TV-MA, TV-14, TV-PG, TV-G, TV-Y7)
Age 7-13: Block TV-MA to TV-G (TV-MA, TV-14, TV-PG, TV-G)
Age 14-16: Block TV-MA
Age 17 and above: No block Table 1 shows North American rating information in summarized form. Examples of rating information for children include TV-Y, TV-Y7; information for all viewers includes TV-G, TV-PG, TV-14, and TV-MA. The numbers in these information indicate parental control. By transmitting such rating information together with television program broadcasts, desired parental control can be effected. TV-Y denotes children programs, with the number following Y (such as 7) indicating that parental control is imposed on children in the 0 to 6 age bracket. By designating one or more conditions from TV-Y (with no particular age limitation) to TV-MA (not suitable for 16 years of age or younger), it becomes possible to block programs rated for TV-MA to TV-Y7 when certain ages, such as 0-6, are entered. Such rating system is denoted as TV Guidelines or TVG.

TABLE 2

When divided into TV-Y and rest

| | | |
|---|---|---|
| TV-Y | For all children | |
| TV-Y7 | For age 7 and above | 0-6 FV |
| TV-G | For all ages. Also suitable for small children. | |
| TV-PG | Not suitable for small children | 7-13 DLSV |
| TV-14 | Not suitable to age 13 and below | 7-13 DLSV |
| TV-MA | Not suitable to age 16 and below | 14-16 LSV |

Age 0-6: Block TV-Y7
Age 7 and above: No block
Age 7-13: Block TV-MA to TV-PG (TV-MA, TV-14, TV-PG)
Age 14-16: Block TV-MA
Age 17 and above: No blocking
D: Sexually suggestive dialog: Automatically attached when blocking TV-PG, TV-14
L: Adult Language: Automatically attached when blocking TV-PG, TV-14, TV-MA
S: Sexual Content: Automatically attached when blocking TV-PG, TV-14, TV-MA
V: Violence: Automatically attached when blocking TV-PG, TV-14, TV-MA
FV: Fantasy Violence: Automatically attached when blocking TV-Y7

Table 2 shows a case where TV-Y (TV-Y7) and the remainder are set. When limitations are imposed as shown in Table 2 in two groups, namely, TV-Y7 and TV-G to TV-MA, TV-Y7 and TV-MA to TV-G are all blocked upon entry of 0 to 6 ages.

TABLE 3

MPAA Rating for movies

| | | |
|---|---|---|
| G | For all ages | |
| PG | May not be suitable to children | 0-12 |
| PG13 | Not suitable to age 12 and below | 0-12 |
| R | Under 17 requires accompanying parent or adult guardian | 13-16 |
| NC-17 | No one 17 and under admitted | 13-17 |
| X | No one 17 and under admitted | 13-17 |

Age 0-12: Block X to PG (X, NC-17, R, PG13, PG)
Age 13-16: Block X to R (X, NC-17, R)
Age 17: Block NC-17 and X
Age 18 and above: No blocking Table 3 shows a table of rating (MPAA Rating) for movies. G denotes no age limitation, and PG denotes limitation for children, with the following numbers indicating inappropriate age, such as 13 indicating that children of 12 years or age or younger should not be allowed to view, for example. PG13 indicates that the movie is not suitable for 12 years of age or younger; R indicates that the movie requires the presence of caretaker for 16 years of age or younger; NC-17 denotes movies prohibited for 17 years of age or younger; X also denoting movies prohibited for 17 years of age or younger. When ages 0 to 12 are entered, X to PG are blocked; when ages 13 to 16 are entered, X to R are blocked; when ages 17 is entered, NC-17 and X are blocked while allowing 18 years of age or older.

TABLE 4:

Canadian English Language Rating

| | | |
|---|---|---|
| E | Exempt | |
| C | Age 7 and below | |
| C8+ | Age 8 and above | 0-7 |
| G | Suitable for all ages | 8-13 |
| PG | Accompanying parent suggested for age 8-13 | 8-13 |
| 14+ | Age 14 and above | 8-13 |
| 18+ | Adult | 14-17 |

Age 0-7: Block 18+ to C8+ (18+, 14+, PG, G, C8+)
Age 8-13: Block 18+ to G (18+, 14+, PG, G)
Age 14-17: Block 18+
Age 18 and above: No blocking Table 4 shows Canadian rating information for English programs. E denotes programs exempted from parental control; C denotes programs allowed to be viewed by children of 7 years of age or younger by themselves; C8+ denotes programs allowed to be viewed by children 8 years of age or older by themselves. Thus, the conditions set forth in Table 4 are different from those of Table 1.

TABLE 5

Canadian French Language Rating

| | | |
|---|---|---|
| E | Exempt | |
| G | Suitable for all ages | |
| 8ans+ | Not recommended for age 7 and below | 0-7 |
| 13ans+ | Not suitable for 12 and below | 8-12 |
| 16ans+ | Not suitable for 15 and below | 13-15 |
| 18ans+ | Adult | 16-17 |

Age 0-7: Block 18ans+ to 8ans+ (18ans+, 16ans+, 13ans+, 8ans+)
Age 8-12: Block 18ans+ to 13ans+ (18ans+, 16ans+, 13ans+)
Age 13-15: Block 18ans+ to 16ans+ (18ans+, 16ans+)
Age 16-17: Block 18ans+
Age 18 and above: No blocking Table 5 shows Canadian rating information with regard to French-language programs. E denotes programs exempted from parental control; G denotes programs allowed to be viewed by children of 8 years of age or older by themselves; 8ans+ denotes programs not recommended for 7 years of age or younger. Thus, Table 5 specifies conditions different from those of Table 4.

standards in a corresponding manner, which are to be set on the basis of age input. For example, when a 0 to 6 years-old parental control is to be imposed, the individual standards denote differently; namely, the TVG denotes TV-Y7, the MPAA denotes PG, the Canadian English standard denotes C8+, and the Canadian French standard denotes 8ans+. In some cases, no setting is to be made.

TABLE 6

Minimum rating levels set by age input

| age | TV Guidelines | MPAA | Can. Eng. | Can. Fre. |
|---|---|---|---|---|
| 0-6 | TV-Y7 | PG | C8+ | 8ans+ |
| 7 | TV-G | PG | C8+ | 8ans+ |
| 8-12 | TV-G | PG | G | 13ans+ |
| 13 | TV-G | R | G | 16ans+ |
| 14-15 | TV-MA | R | 18+ | 16ans+ |
| 16 | TV-MA | R | 18+ | 18ans+ |
| 17 | — | NC-17 | 18+ | 18ans+ |
| Age 18 and above | — | — | — | — |

—: No setting

Table 6 shows the lowest rating levels of the aforementioned TVG, MPAA, Canadian English, and Canadian French

TABLE 7

Ex.: When viewer age is set to be 13, display and set as follows:

Enter 13
TVG: TV-G DLSV
MPAA: R
Canadian English: G
Canadian French: 16ans+
For the menu screen, see FIG. 4.

Figure 4:
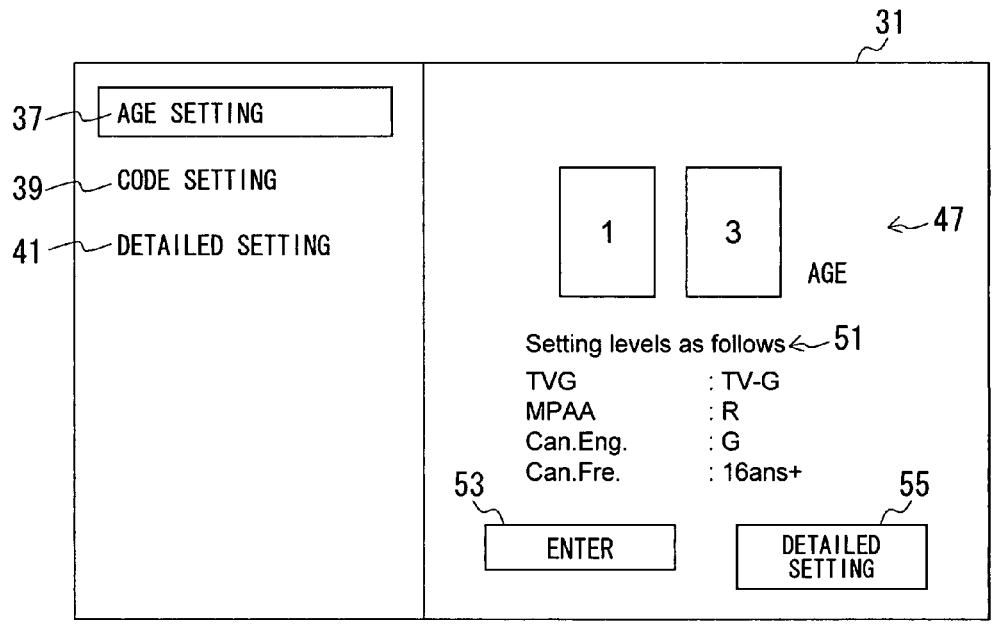
FIG. 4 shows a second example of viewer age setting menu display.

Table 7 shows an example of setting for the viewer age of 13. For example, when the administrator enters 13, it is shown on a menu screen as shown in FIG. 4. And level settings regarding individual types of rating information are displayed based on each of the above standards, as will be described below with reference to FIG. 4.

TABLE 8

```
0000: —
0001: TVG: TV-MA    MPAA: —        Canadian English: —      Canadian French: —
0002: TVG: TV-14    MPAA: —        Canadian English: —      Canadian French: —
0003: TVG: TV-PG    MPAA: —        Canadian English: —      Canadian French: —
0004: TVG: TV-G     MPAA: —        Canadian English: —      Canadian French: —
0005: TVG: TV-Y7    MPAA: —        Canadian English: —      Canadian French: —
0006: TVG: TV-Y     MPAA: —        Canadian English: —      Canadian French: —
0010: TVG: —        MPAA: X        Canadian English: —      Canadian French: —
0020: TVG: —        MPAA: NC-17    Canadian English: —      Canadian French: —
0030: TVG: —        MPAA: R        Canadian English: —      Canadian French: —
0040: TVG: —        MPAA: PG13     Canadian English: —      Canadian French: —
0050: TVG: —        MPAA: PG       Canadian English: —      Canadian French: —
0060: TVG: —        MPAA: G        Canadian English: —      Canadian French: —
0100: TVG: —        MPAA: —        Canadian English: 18+    Canadian French: —
0200: TVG: —        MPAA: —        Canadian English: 14+    Canadian French: —
0300: TVG: —        MPAA: —        Canadian English: PG     Canadian French: —
0400: TVG: —        MPAA: —        Canadian English: G      Canadian French: —
0500: TVG: —        MPAA: —        Canadian English: C8+    Canadian French: —
0600: TVG: —        MPAA: —        Canadian English: C      Canadian French: —
0700: TVG: —        MPAA: —        Canadian English: E      Canadian French: —
1000: TVG: —        MPAA: —        Canadian English: —      Canadian French: 18ans+
2000: TVG: —        MPAA: —        Canadian English: —      Canadian French: 16ans+
3000: TVG: —        MPAA: —        Canadian English: —      Canadian French: 13ans+
4000: TVG: —        MPAA: —        Canadian English: —      Canadian French: 8ans+
5000: TVG: —        MPAA: —        Canadian English: —      Canadian French: G
6000: TVG: —        MPAA: —        Canadian English: —      Canadian French: E
```

—: No setting

○ When entering a code:

First digit: TVG setting

Second digit: MPAA setting

Third digit: Canadian English setting

Fourth digit: Canadian French setting

Table 8 shows an example where a four-digit code is entered. The TVG, MPAA, Canadian English, and Canadian French standards individually correspond to the "0" or "1" in each of the digits of the code that is entered. The first digit from the right corresponds to the TVG setting; the second digit (from the right) corresponds to the MPAA setting; the third digit (from the right) corresponds to the Canadian English setting; and the fourth digit (from the right) corresponds to the Canadian French setting. For example, a code "0000" denotes no setting. A code "0004" denotes that TVG imposes the TV-G parental control but none of the MPAA, Canadian English, and Canadian French standards imposes any parental control. Table 8 shows an example in which no their settings is overlapping among the four kinds of parental control.

detailed setting 41, are selectably provided. In the figure, the viewer age setting 37 is selected. In this case, a viewer age input area 47 and an associated message 45 "Enter viewer age" are provided in the right-side area.

FIG. 4 shows a second example of the viewer age setting menu display. In an area to the left of the display screen 31, three items are selectably provided, namely, viewer age setting 37, code setting 39, and detailed setting 41. In the figure, the viewer age setting 37 is selected. In this case, in FIG. 4, a viewer age input area 47 and an associated message 45 "Enter viewer age" are provided in the area to the right of the screen. When the viewer age setting 37 is focused, the focus is moved to the age input field using the right cursor key of the remote controller or the like, and age is entered. The ratings are shown upon entry of age. For example, the focus can be

TABLE 9

| | | | |
|---|---|---|---|
| 1111: TVG: TV-MA | MPAA: X | Canadian English: 18+ | Canadian French: 18ans+ |
| 2222: TVG: TV-14 | MPAA: NC-17 | Canadian English: 14+ | Canadian French: 16ans+ |
| 3333: TVG: TV-PG | MPAA: R | Canadian English: PG | Canadian French: 13ans+ |
| 4444: TVG: TV-G | MPAA: PG13 | Canadian English: G | Canadian French: 8ans+ |
| 5555: TVG: TV-Y7 | MPAA: PG | Canadian English: C8+ | Canadian French: G |
| 6666: TVG: TV-Y | MPAA: G | Canadian English: C | Canadian French: E |
| 6766: TVG: TV-Y | MPAA: G | Canadian English: E | Canadian French: E |

Table 9 also shows an example in which a four-digit code is entered, as in Table 8; however, in this example, their settings of parental control are overlapping among the TVG, MPAA, Canadian English, and Canadian French standards. For example, when the input code is "1111", TVG sets TV-MA, MPAA sets X, Canadian English sets 18+, and Canadian French sets 18ans+ for parental control. Thus, there are cases in which a plurality of types of rating information (MPAA, TV Guidelines, Canadian English, and Canadian French) have setting items together.

In the following, the functions of the television receiver A of FIG. 1 capable of referring to the above rating information are described with reference to its display menu.

Figure 2:
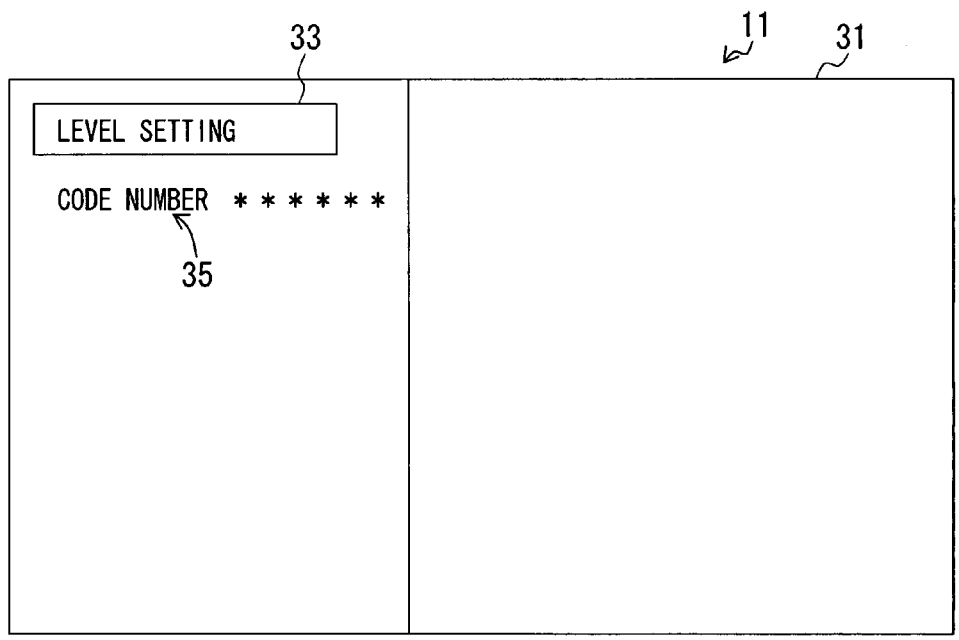
FIG. 2 shows an example of display on a display unit 11, showing an example of parental control process.

FIG. 2 shows a screen shown on the display unit 11, with reference to which processes relating to parental control will be described. The screen shows a menu screen displayed when parental control item has been set in a layer above the layer shown. As shown in the figure, the menu display is shown on the display screen 31 of the display unit 11. In this example, a level setting area 33 and a code number input area 35 are located on the left areas of the display screen 31.

Thus, in the level setting process, first the code number is set. After that, entry of the correct code number is required for parental control selection. Unless the correct code number is entered, the parental control item cannot be selected.

Figure 3:
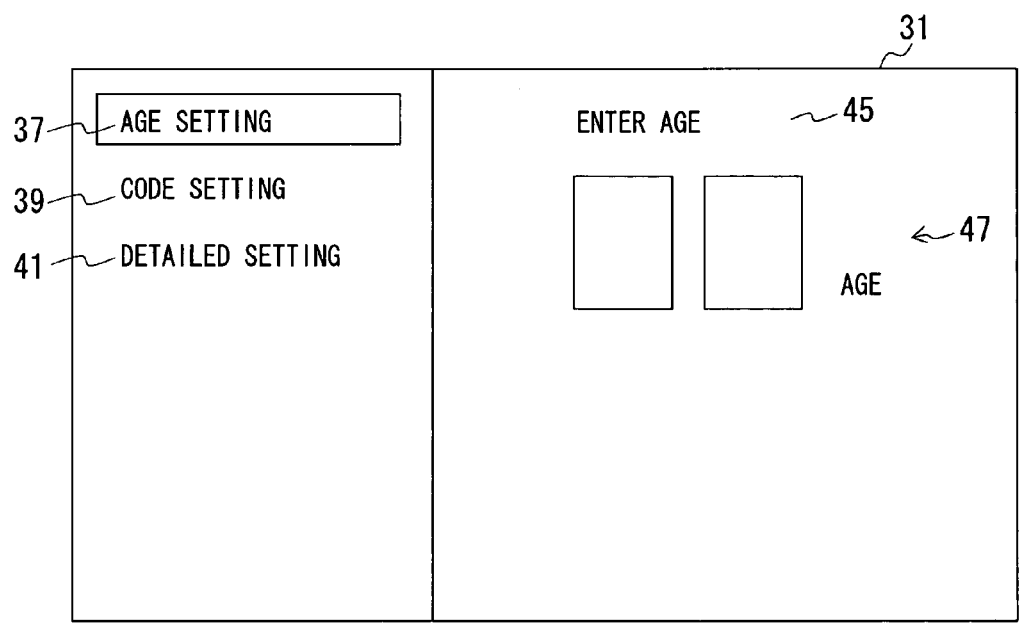
FIG. 3 shows a first example of viewer age setting menu display.
Figure 5:
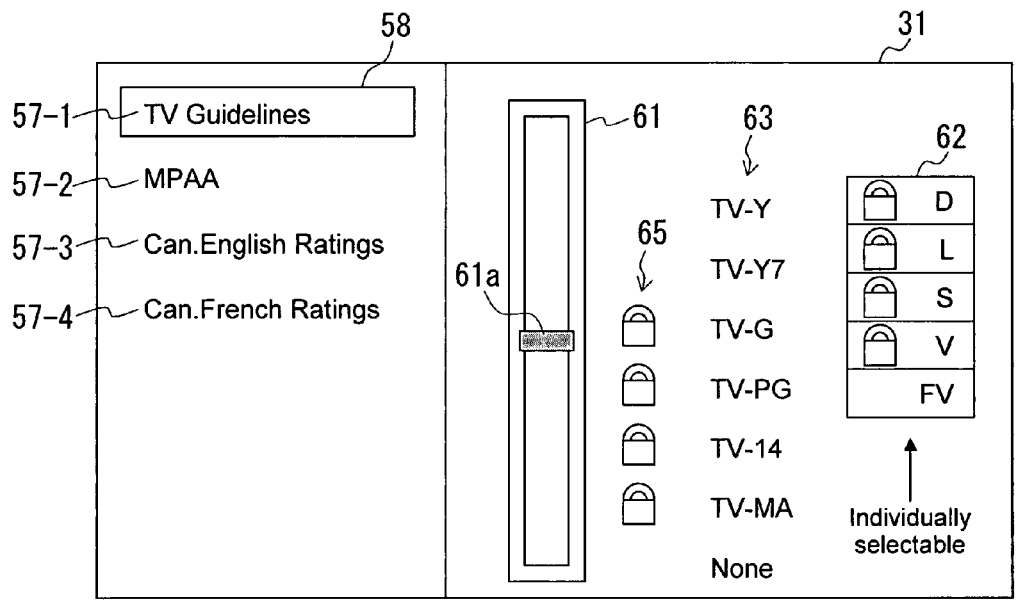
FIG. 5 shows an example of menu display upon selection of Detailed Setting, following the pressing of an enter button in an age setting.

FIG. 3 shows a first example of a viewer age setting menu display. In the left area of the display screen 31, three items, namely, a viewer age setting 37, a code setting 39, and a moved to the fields for enter 53 or detailed setting 55 using the bottom cursor key or the like. When the enter key is pressed with its being focused, the viewer age input area 47 is displayed and also a message 51 is displayed indicating that "Setting levels as follows". When the enter 53 is pressed, the focus will move to the viewer age setting 47; when the detailed setting 55 is pressed, the screen shifts to the display screen shown in FIG. 5, which shows an example of menu display upon selection of the detailed setting, following the pressing of the enter button during the age setting. As shown in FIG. 5, TV Guidelines 57-1, MPAA 57-2, Can. English Ratings 57-3, and Can. French Ratings 57-4 are displayed as selective items for types of rating information. In the figure, TV Guidelines 57-1 is focused by selection 58.

In this case, D•L•S•V•FV shown in Table 2 are individually selectable (62), and it is possible to select TV-Y, TV-Y7, TV-G, TV-PG, TV-14, TV-MA, or None (63). In practice, it is possible to easily set the limitation level of lock 65 by using a slide bar 61 including a movable bar 61a for setting parental control based on rating information.

Figure 6:
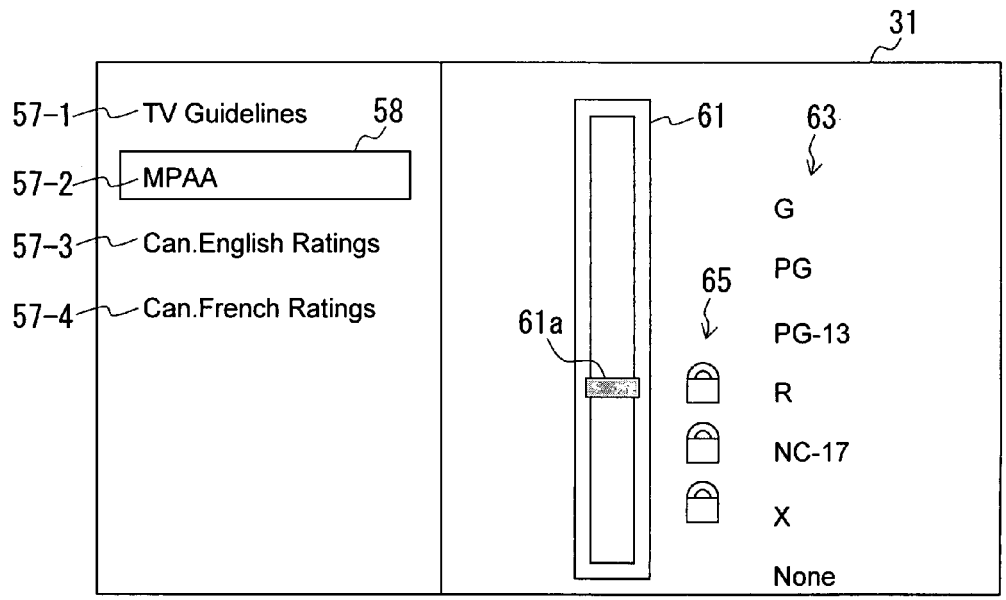
FIG. 6 shows an example of menu display upon selection of MPAA using a bottom cursor.

FIG. 6 shows an example of menu display upon selection of MPAA using the bottom cursor. As shown in FIG. 6, when MPAA 57-2 is selected (58) among the selective items for types of rating information, movie ratings of Table 3 are shown on the right side (63), where the slide bar 61/61a may be slid to impose parental control. In the figure, parental control up to R is imposed.

Figure 7:
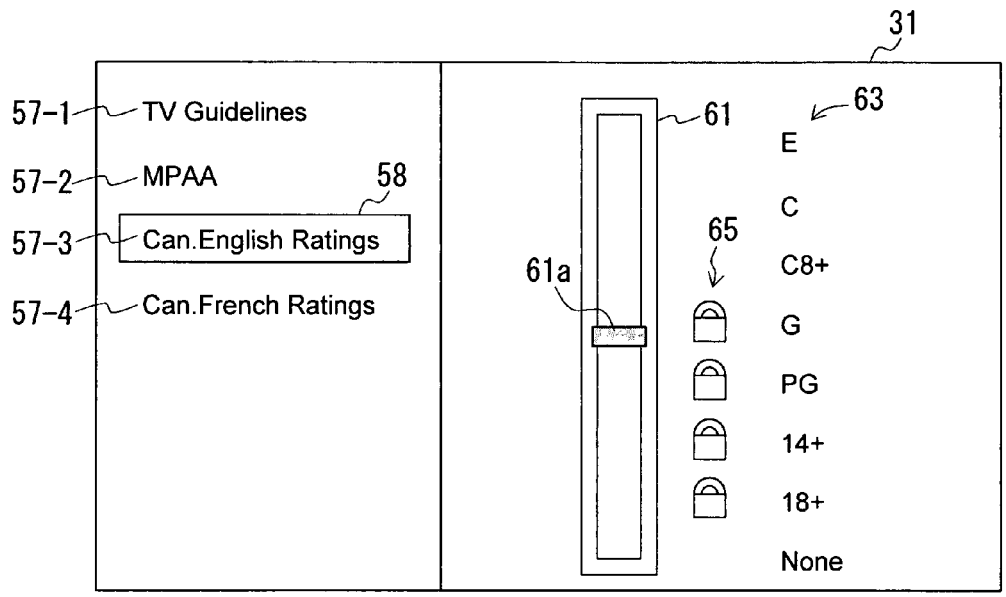
FIG. 7 shows an example of menu display upon selection of Can. English Ratings using a bottom cursor.

FIG. 7 shows an example of menu display upon selection of Can. English Ratings using the bottom cursor. As shown, when Can. English Ratings 57-3 is selected among the selective items for types of rating information (58), the ratings of Table 4 are displayed on the right hand side (63), where the slide bar 61/61*a* can be slid to impose parental control. In the figure, parental control up to G is imposed.

Figure 8:
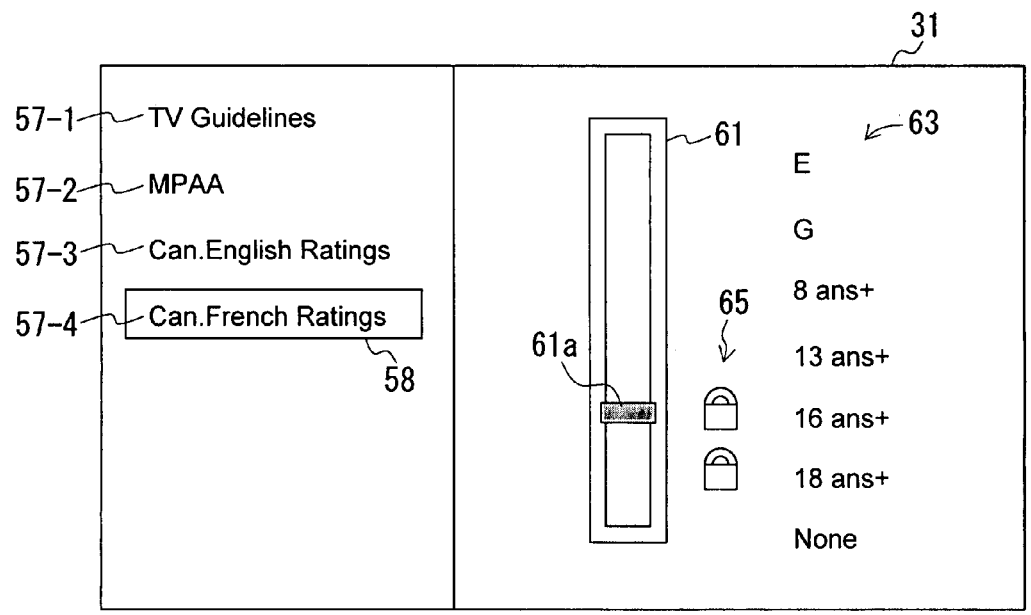
FIG. 8 shows an example of menu display upon selection of Can. French Ratings using a bottom cursor.

FIG. 8 shows an example of menu display upon selection of Can. English Ratings using the bottom cursor. As shown in FIG. 8, when Can. French Ratings 57-4 is selected among the selective items for types of rating information (58), the ratings of Table 5 are displayed on the right-hand side (63), where the slide bar 61/61*a* can be slid to impose parental control. In the figure, parental control up to 16ans+are imposed.

Figure 9:
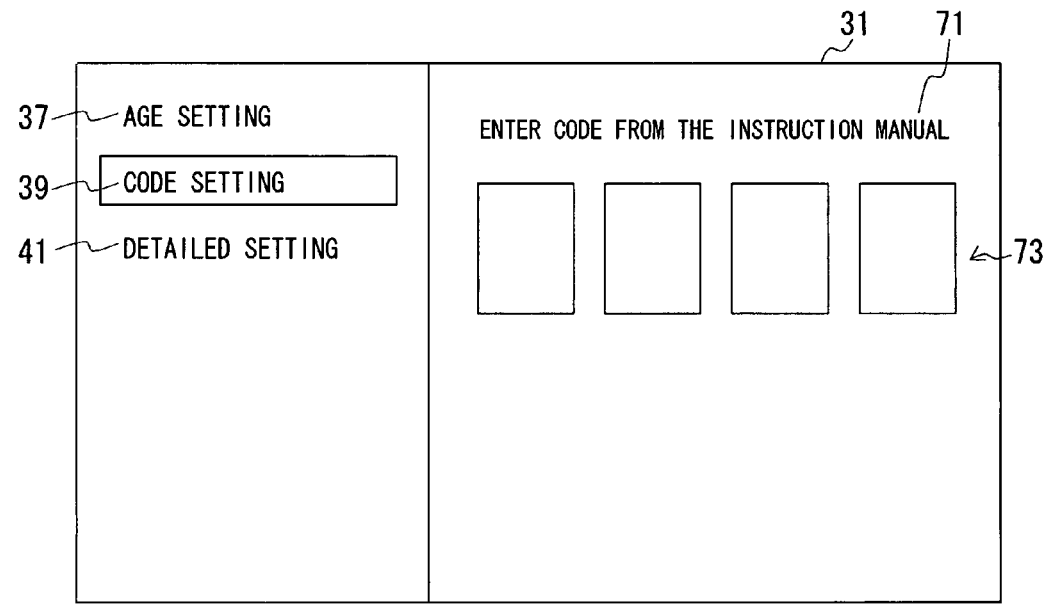
FIG. 9 shows a first display example of code setting menu display.

FIG. 9 shows a first example of the code setting menu display. As shown, when code setting 39 is selected, a message 71 such as "Enter a code from instruction manual" is displayed to the right of the display screen 31, where a code can be entered in a four-digit input column 73.

Figure 10:
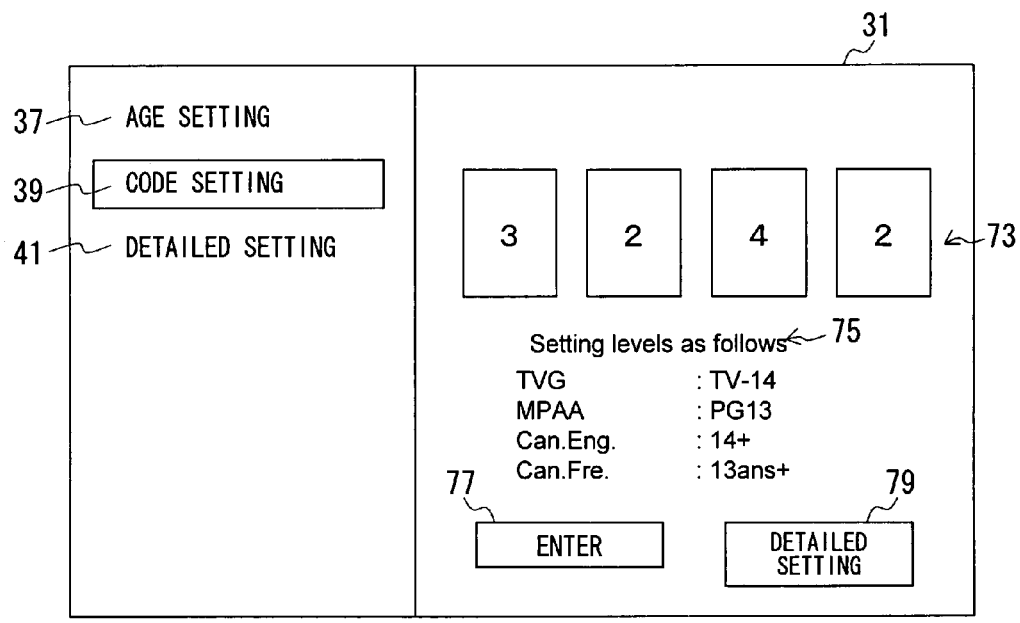
FIG. 10 shows a second display example of code setting menu display.

FIG. 10 shows a second example of the code setting menu display. As shown, when code setting 39 is selected, the four-digit input column 73 is displayed to the right of the display screen 31, where a code can be entered. In an area below that, levels to be set are shown (75) for the user confirmation. After confirmation, the user can choose either enter 77 or detailed setting 79. When the code setting is focused, the focus can be moved to the code entry field by using the right cursor key among the direction keys on the remote controller. Ratings and others are displayed upon entry of the code. The focus can be shifted to "Enter" or"Detailed setting" by means of the bottom cursor key, for example. When the enter key is pressed now, the focus shifts to the code setting; when the "Detailed setting" key is pressed, the following display is made.

Figure 11:
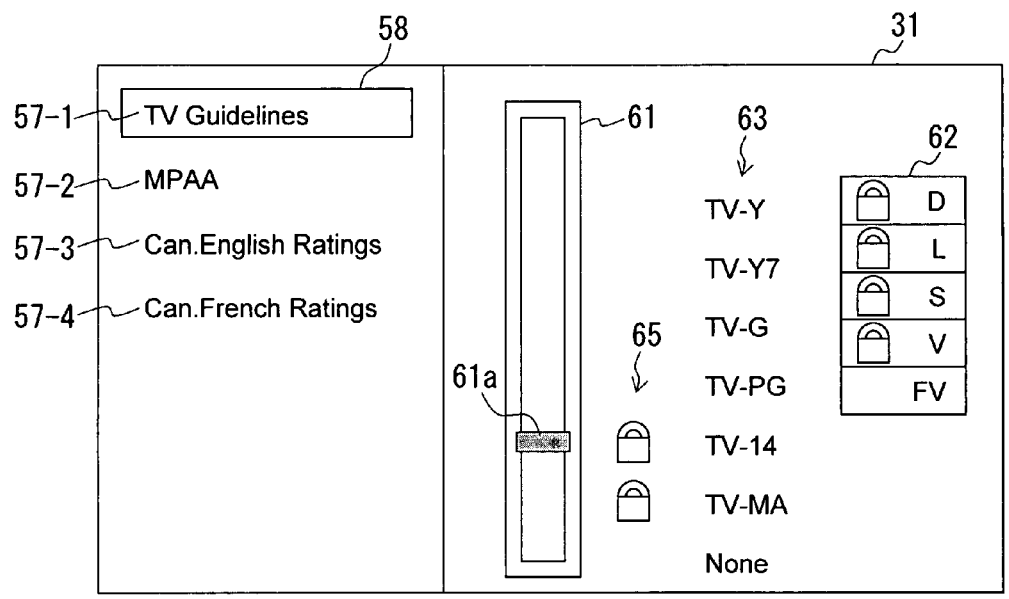
FIG. 11 shows an example of menu display upon selection of Detailed Setting (following the pressing of the enter button in a code setting ).

FIG. 11 shows an example of menu display upon selection of the detailed setting (i.e., after pressing "Enter" button in the code setting). In the example of FIG. 11, in the menu upon selection of the detailed setting following the pressing of the enter button in the code setting, parental control up to TV-14 is set by sliding the slide bar 61/61*a* with the focus placed on TV Guidelines 57-1 (58).

Figure 12:
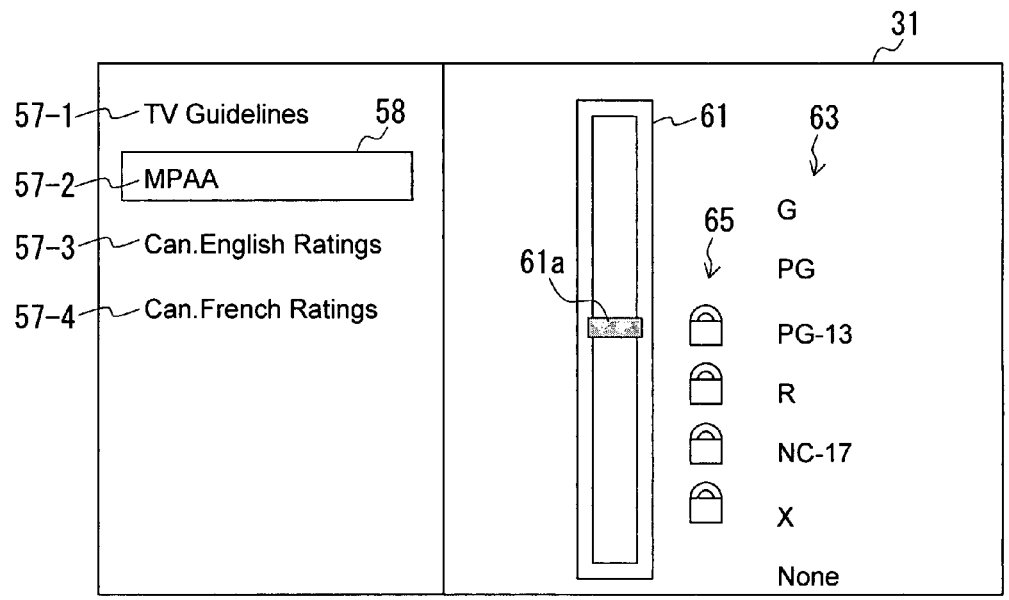
FIG. 12 shows an example of display transitioned from the screen of FIG. 11, upon selection of MPAA using a low direction key (bottom cursor).

FIG. 12 shows the screen to which the screen of FIG. 11 has transitioned, in which MPAA is selected by the bottom-direction key (bottom cursor). In this case, setting candidates 63 for MPAA are shown, as indicated by numeral 63, where the slide bar 61/61*a* has been slid to set parental control up to PG-13.

Figure 13:
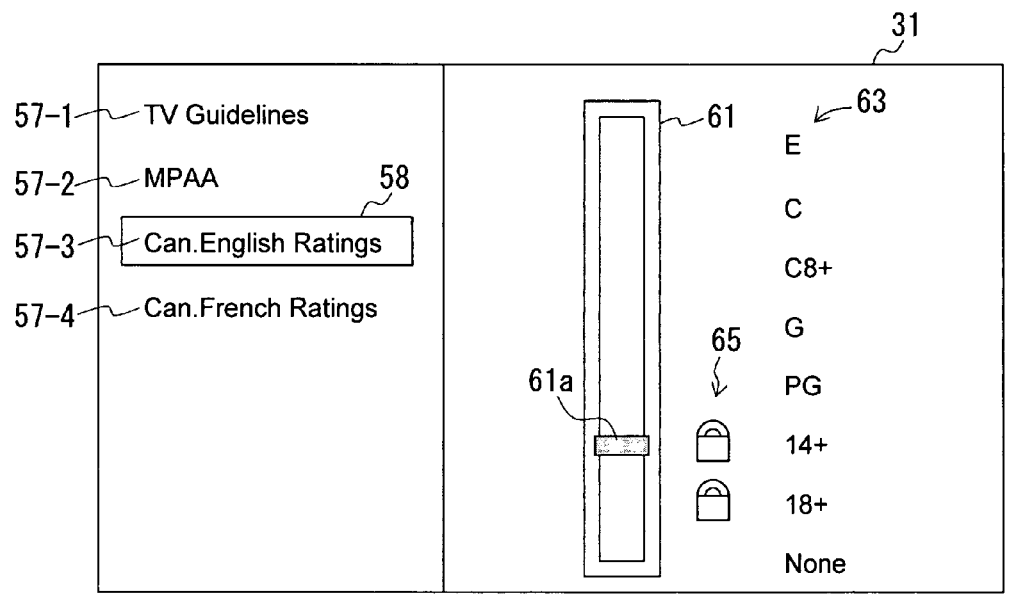
FIG. 13 shows an example of menu display transitioned from the screen of FIG. 11 upon selection of Can. English Ratings 57-3 (58) using the low direction key (bottom cursor).

FIG. 13 shows an example of menu display to which the screen of FIG. 11 has transitioned, where Can. English Ratings 57-3 is selected (58) by the bottom-direction key (bottom cursor). When Can. English Ratings are selected, the rating information of Table 4 are displayed, as indicated by numeral 63. In this case, the slide bar 61/61*a* has been slid to set parental control up to 14+.

Figure 14:
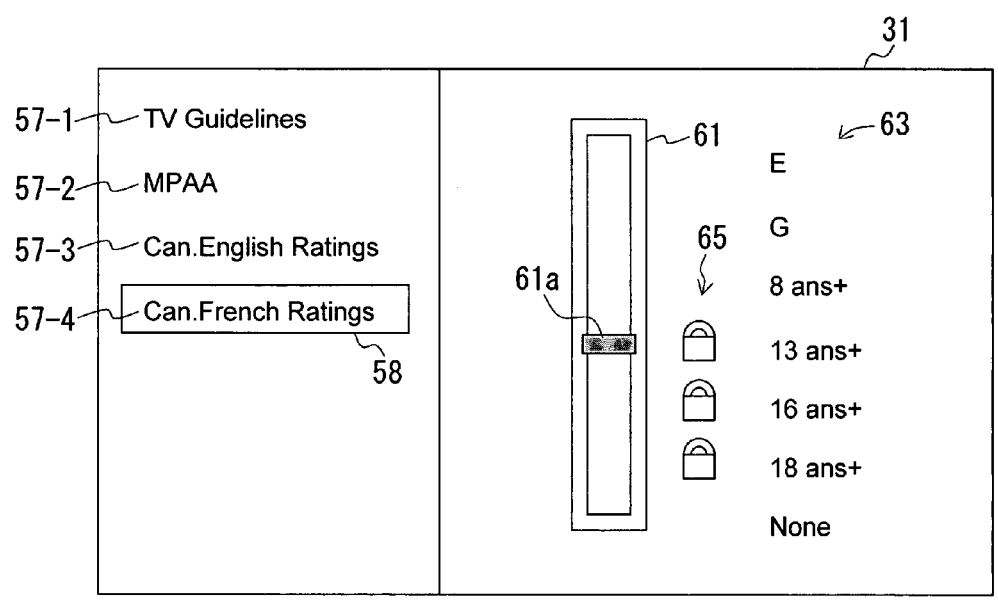
FIG. 14 shows an example of menu display transitioned from the screen of FIG. 11 upon selection of Can. French Ratings 57-4 (58) using the bottom cursor.

FIG. 14 shows an example of menu display to which the screen of FIG. 11 has transitioned, where Can. French Ratings 57-4 are selected (58) by the bottom cursor. When Can. French Ratings are selected, the rating information of Table 5 are displayed, as indicated by numeral 63. In this case, the slide bar 61/61*a* has been slid to set parental control up to 13ans+.

As described above, in the television receiver of the present embodiment, the rating information storage unit stores Tables 1 to 9, and the information in these tables can be referred to as needed on the basis of an instruction from the control unit 21. Thus, based on a simple operation by the user of setting the age, for example, parental control up to the rating level corresponding to the entered age can be automatically set.

Further, by entering numbers or signs corresponding to the tables (such as Tables 1 to 9) in which associations are made, detailed ratings can be set.

In the following, the television receiver according to a second embodiment of the invention is described with reference to the drawings.

Figure 15:
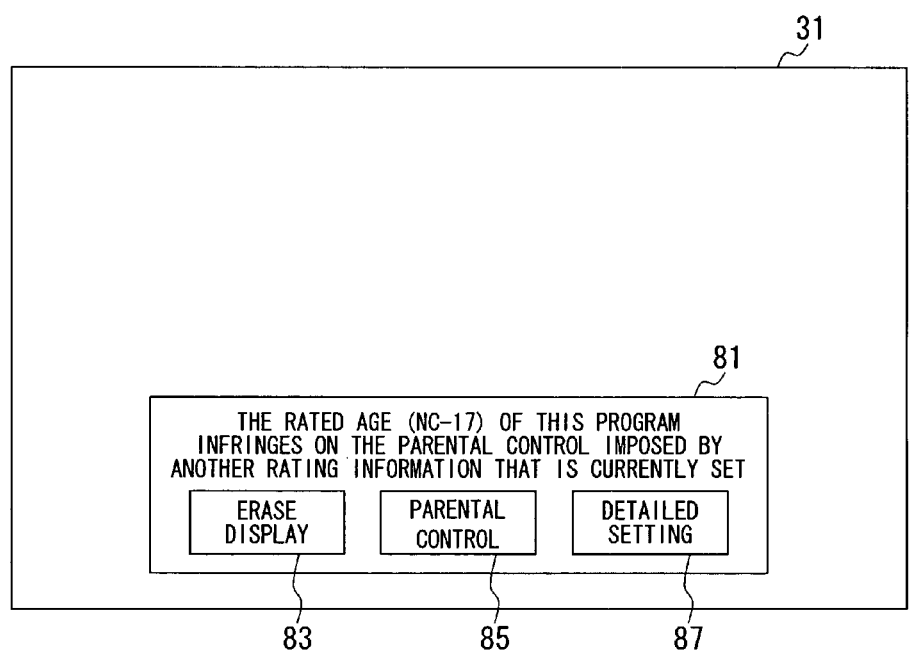
FIG. 15 shows an example of a message that is displayed when the same age has not been subject to parental control by different types of rating information, in a second embodiment of the invention.

FIG. 15 shows an example of message that is displayed when the same age is not subjected to parental control among different types of rating information. When TVG is set to TV-14 and MPAA is not set at all, if a program rated for MPAA NC-17 is viewed, the display screen 31 shows a message "The viewer age (NC-17) of this program is infringes the age limitation according to another rating information that is currently set", thus alerting the user, with three types of buttons, namely, "Erase display" 83, "Parental control" 85, and "Detailed setting" 87 provided. In the figure, focus is assumed to be now placed on the erase display 83. Upon depressing of the enter button, the display is erased. If the enter button is pressed with "Parental control" 85, parental control is imposed. If the enter button is pressed with "Detailed setting" 87, the following display is made.

Figure 16:
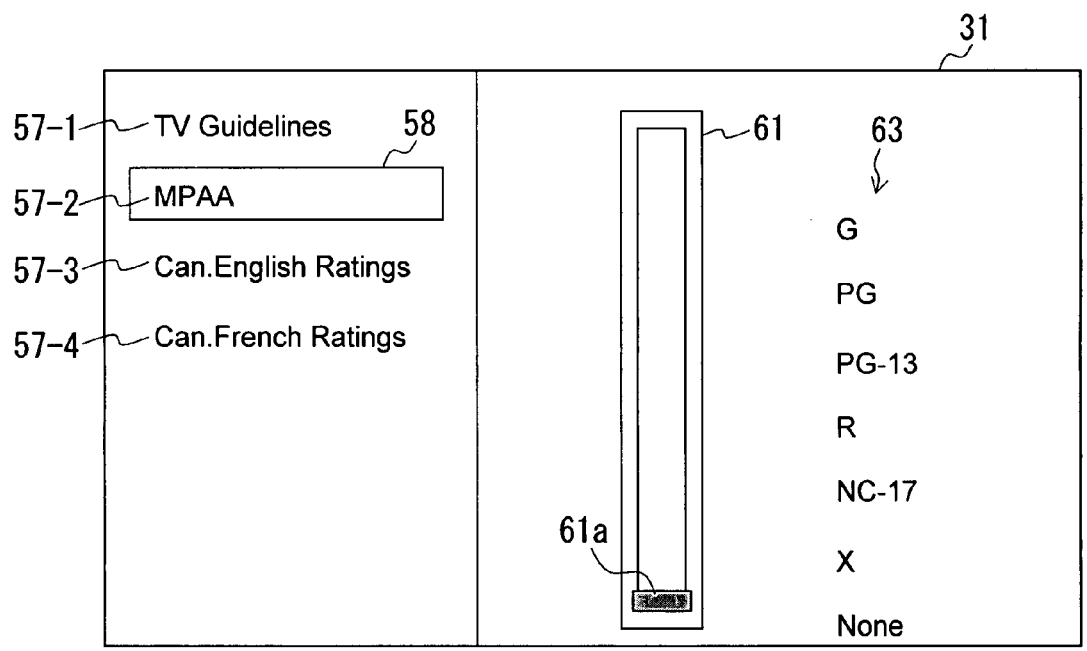
FIG. 16 shows an example of menu display upon selection of MPAA during the selection of detailed setting.

FIG. 16 shows an example of menu display upon selection of the detailed setting, where MPAA is selected. As shown, when MPAA 57-2 is focused (58), the rating information items of Table 3 are displayed (63), where the slide bar 61/61*a* can be slid to set parental control. In the figure, 61*a* is at the bottom, meaning that none of the parental controls are being imposed. Thus, the settings can be made so as to impose no parental control at all.

Figure 17:
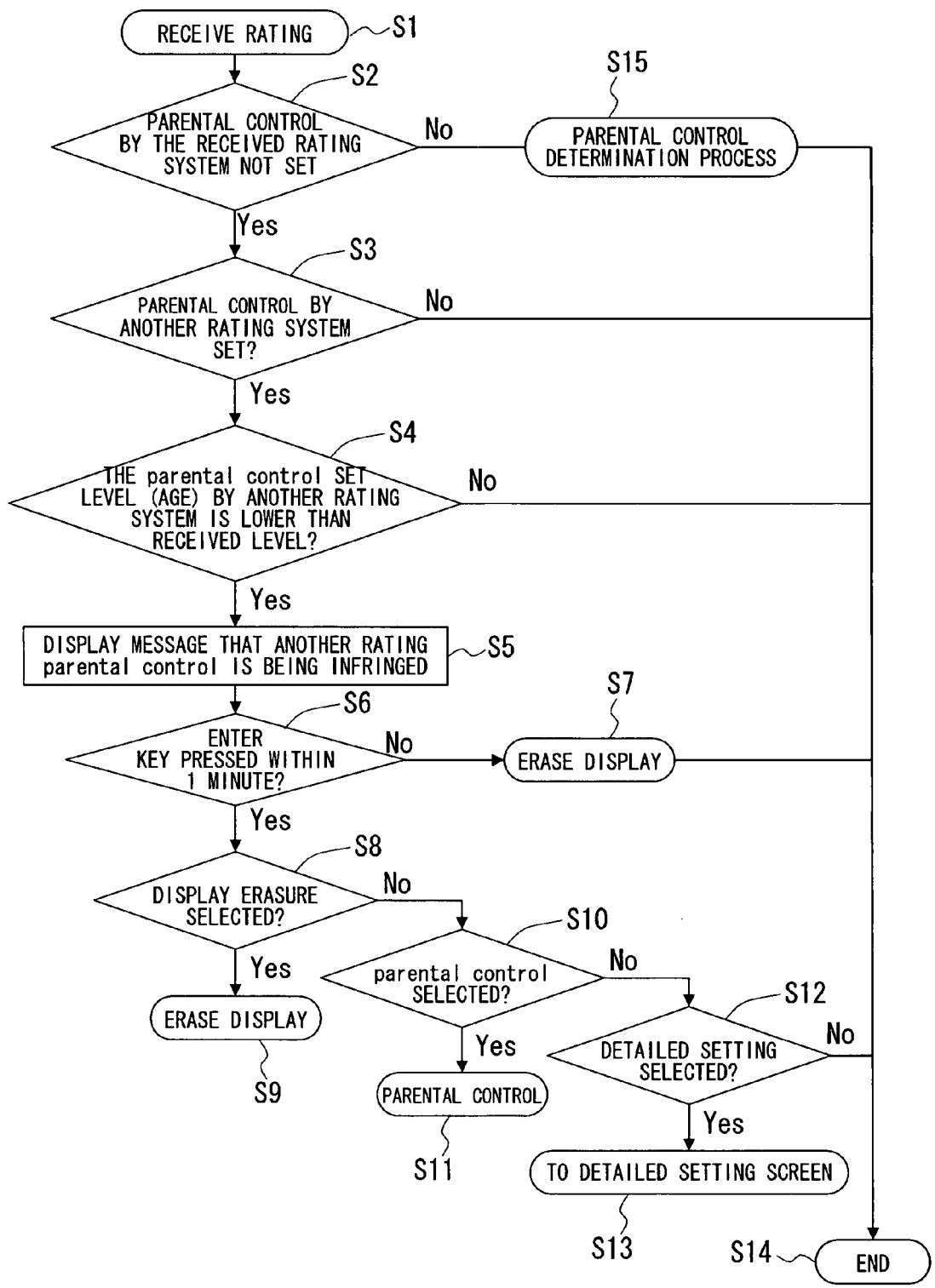
FIG. 17 shows a flowchart of a process in a case where the same age is not subject to parental control by different types of rating information.

Hereafter, the flow of the parental control setting process based on the above display menu according to the present embodiment will be described with reference to the drawings. FIG. 17 shows a flowchart of the process in a case where the same age is not subject to parental control among different types of rating information. Namely, this is an example in which a received rating system is not set for parental control. In this case, upon reception of a rating in step S1, it is determined in step S2 whether or not the parental control setting of the received rating system is set. If it is set (No), the process proceeds to step S15, where a normal parental control decision process is carried out, followed by step S14 where the process completes. If Yes, the process proceeds to step S3 where it is determined whether or not the parental control setting of another rating system is set. If not (No), the process proceeds to step S14 and the process ends. If it is set (Yes), the process proceeds to step S4 where it is determined whether or not the parental control setting level (age) of the other rating system is lower than the received level. If not (No), the process proceeds to step S14 and the process ends. If it is lower (Yes), the process proceeds to step S5 where a message that the parental control by the other rating system is being infringed is displayed.

It is determined next whether or not the enter key has been pressed within 1 minute, for example (step S6). If No, the process proceeds to step S7 to erase the display; if Yes, it is determined in step S8 whether or not the erasure of display is selected. If the erasure of display is selected (Yes), a display erasing process is carried out (step S9). If the erasure of display is not selected (No), it is determined in step S10 whether or not parental control is selected. If parental control is selected (Yes), a parental control process is carried out in step S11; if not (No), the process proceeds to step S12 where it is determined whether or not the detailed setting selection is to be selected. If it is selected (Yes), the screen proceeds to the detailed setting screen in step S13. If it is not selected (No), the process ends in step S14.

Thus, by the above-described process, when the same age is not subject to age parental control by different types of rating information, a message is displayed to the effect that parental control will be imposed by another type of rating information if the age is lower. Then, the user can select either display erasure, a parental control selection, or a detailed setting selection. Thus, it is determined whether or not different types of rating information impose the same age limitation, and, based on the result of such determination, an opportunity to reset is provided, making it possible to overcome inconsistencies among a plurality of types of parental control.

By thus displaying such message on the screen if the rating of a currently viewed program for which no parental control setting is made in terms of one type of rating information is equal to or higher than the age rated by another type of rating information, the user can be given a final opportunity to determine if the program should be allowed to children. Thus, parents, for example, can watch television with their children without worry.

Hereafter, a third embodiment of the invention will be described with reference to the drawings. The term "content reproducing apparatus" herein, refers to a wide concept including, for example, television receiving apparatus, recording/reproducing apparatus with recording capabilities enabled by HDD or the like, personal computer, and cell phones. Further, general parental control associated with content is defined as a first limitation, while age limitation inferred from information regarding content, such as content information (program information) is defined as a second limitation.

Figure 18:
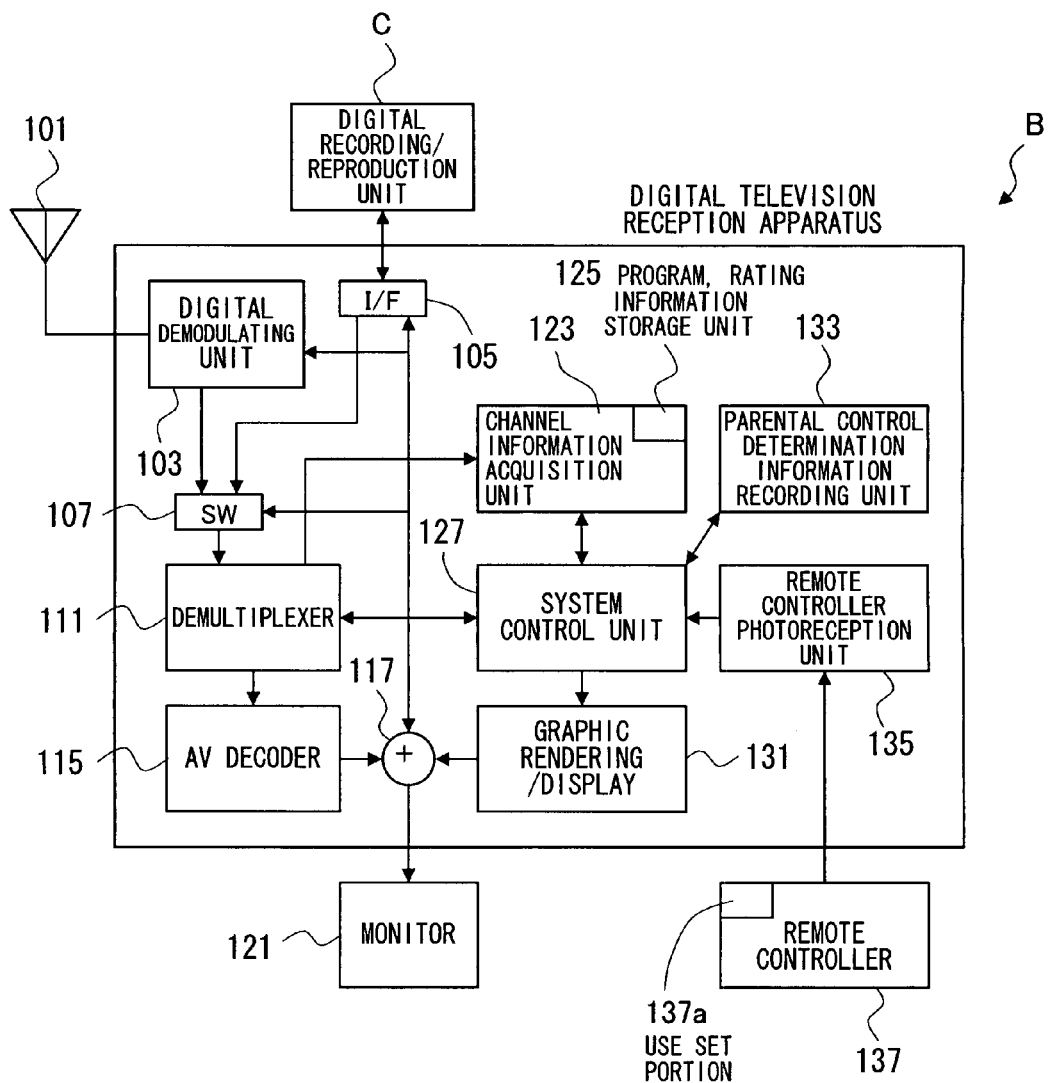
FIG. 18 shows a functional block diagram of the digital television receiving apparatus according to a third embodiment of the invention.

A digital television receiving apparatus according to the present embodiment is described with reference to the drawings. FIG. 18 shows a functional block diagram of the digital television receiving apparatus. As shown, the digital television receiving apparatus B includes an antenna 101, a digital demodulation unit 103 including a tuner, a demultiplexer 111, an AV decoder 115, an output unit 117 for outputting a synthesized signal, a channel information acquisition unit 123, a system control unit (CPU) 127 for overall control of the apparatus, a graphic rendering/display unit 131, a parental control decision information recording unit 133, a remote controller photoreception unit 135, a desired monitor (which may be either internal or external) 121, and a remote control unit 137.

An interface unit (I/F) 105, such as IEEE1394, may also be provided, via which an external digital recording/reproducing unit C (such as a hard disc recorder), for example, may be connected. Video can be outputted to the monitor 121 based on a signal from the output unit 117. Using the remote controller 137, the user can remotely control the digital television receiving apparatus B. The remote controller 137 includes a user setting unit 137a allowing the user to set viewer age or the like in the digital television receiving apparatus B. The channel information acquisition unit 123 acquires information such as PMT or EIT (SIT), for example, contained in the broadcast wave or the signal from the recording/player, and records it in the rating information storage unit 125. The parental control decision information recording unit 133 is composed of a database of keywords and ages that are paired. As in general databases, the contents of the database can be updated or otherwise modified. The parental control decision information recording unit 133 may be externally provided as an external storage unit or a server that can be connected to the Internet, for example.

In the following, various types of information used are defined and described. Because there are differences between Japan and North America, the information will be described in terms of both.

(1) In Japan

1) Location of Rating Information Described
a) Tuner (broadcast wave) input: PMT (Program Map Table), EIT (Event Information Table)
b) Digital recorder/player input (such as D-VHS) (partial transport stream): SIT (Selection Information Table)

The details of PMT, EIT, and SIT are defined by the (ARIB (Association of Radio Industries and Businesses)). Basics are defined by ISO/IEC 13818-1. PMT has a conditional access system descriptor, and it is a signal that is transmitted every 100 ms. EIT and SIT have parental rate descriptors, which describe the recommended lowest age (from 4 to 20) of viewer.

2) Program Information
a) Tuner (broadcast wave) input: EIT: Program information transmitted on the second time scale.
b) Digital recorder/player input (such as D-VHS) (partial transport stream): SIT EIT and SIT have a shortened format event descriptor and an extended format event descriptor, respectively, the former describing the program name and the latter detailed program information.

(2) In the U.S.

1) Location of Rating Information Described
a) Tuner input: PMT, EIT (Event Information Table)

While PMT is defined by the ISO/IEC 13818-1 as in Japan, there are descriptors different from those of Japan.

EIT is standardized by the ATSC (Advanced Television Systems Committee).
b) Digital recorder/player input (such as D-VHS) (partial transport stream): PMT, SIT (Selection Information Table)

SIT is defined by the CEA (Consumer Electronic Association); contents are different from those of SIT in Japan.

For example, PMT, EIT, and SIT have "Content Advisory Descriptors", describing levels according to the U.S. and Canadian rating systems, such as follows:
a) TV Guidelines: TV-Y7, TV-PG, TV-14, TV-MA
b) MPAA Rating: PG, PG-13, R, NC-17, X, etc.

2) Program information EIT (Event Information Tables), ETT (Extended Text Table)

These describe program name and detailed program information.

In the following, tuning by PAT and PMT is described. In the MPEG 2 packet multiplexing method, which is typically used for digital signals, a plurality of transport stream packets (TSP) each having a fixed length of 188 bytes are multiplexed into a transport stream (TS). In a TS, a plurality of programs can be multiplexed. When a single program is to be selected from a TS including a plurality of programs and decoded, tables called PMT (Program Map Table) and PAT (Program Association Table) are referenced.

Figure 19:
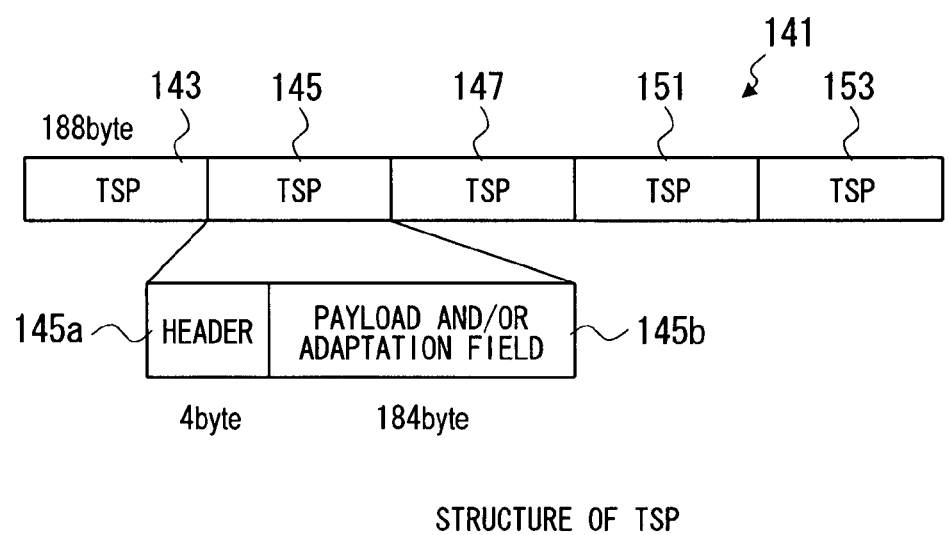
FIG. 19 shows a conventional example of data structure of TSP.

As shown in FIG. 19, TSPs 143 to 153 (145) are divided into a header 145a and a payload and/or adaptation field 145b. The header 145a includes a packet identifier (PID) for identifying each table. PAT, PMT, EIT, video, and voice data are multiplexed as payload data in a TSP having a designated PID.

PAT is a table indicating a plurality of program numbers and the PIDs of the TSPs that include PMT of each program. PMT is a table indicating the PIDs of TSPs that include video and audio data contained in a single program. In Japan, PED for superimposed title is included.

In an example of selection of a program, one program contained in the PAT is selected, PMT is acquired based on the PID of the program, and PID for video or audio is extracted. The acquired data is input to an AV decoder and the program is played back. PID of TSP including PAT is specified as 0x0000. PID of TSP including EIT of Japan (ARIB) is specified as 0x0012, while PID of TSP including SIT is specified as 0x001F. PID of TSP including EIT and ETT of the U.S.(ATSC) is described in MGT (Master Guide Table). SIT is assigned to by the receiver.

In the digital television receiving apparatus of the present embodiment, when parental control (lock) is in place, the viewer age is determined from keywords such as program name and program information. If there is no parental information about the program, or if it is possible that the existing parental information indicates that the program is rated for ages above the target, parental control settings are made based on parental control determined from the keywords or the like contained in the program information. Based on such settings, parental control is imposed, so that it becomes possible to easily perform a parental control process based on the age of the viewer even when only the age is set. Namely, parental information is extracted from keywords such as program name and program information, and parental control can then be effected on the basis of the thus extracted parental information as long as the user sets the age. More specifically, information provided by the broadcast station, such as program name, program information, and subtitle information are acquired, an appropriate viewer age for a particular program is determined, and then the parental control process is carried out with having the user set the viewer age alone.

TABLE 10

Japanese movie rating system

PG-12: Accompanying parent suggested for age 11 and below or elementary school children
→Allowed to age 12 and above
R-15: Neither age 14 and below nor junior high school children admitted
→Allowed to age 15 and above
R-18: No one age 17 and below admitted
→Allowed to age 18 and above

TABLE 11

TV Guidelines

TV-Y7: For age 7 and above
→Allowed to age 7 and above
TV-PG: Not suitable for small children
→Allowed to age 12 and above
TV-14: Not suitable for age 13 and below
→Allowed to age 14 and above
TV-MA: Not suitable for age 16 and below
→Allowed to age 17 and above

TABLE 12

MPAA Rating

PG: Some portrayal may not be suitable for children. Children require parental permission (but no accompanying guardian).
→Allowed to age 13 and above
PG-13: Not suitable to age 12 and below TABLE 12-continued MPAA Rating →Allowed to age 13 and above
R: Under 17 requires accompanying parent adult guardian
→Allowed to age 17 and above
NC-17: No one 17 and under admitted
X: No one 17 and under admitted
→Allowed to age 18 and above

*PG, R, and X when following "MPAA Rating" or "MPAA" since they cannot be determined by themselves Table 10 is a table that shows examples of keywords for viewer age determination that are stored in the parental control decision information recording unit 133 of the digital television receiving apparatus of the present embodiment as implemented in Japan. Table 11 is a similar table in the U.S. Table 12 is a table that shows the ratings by the MPAA.

As shown in Table 10, in Japan, it is possible to use the terms for movie rating systems, such as PG-12, R-15, and R-18, as keywords without change. In the U.S., as shown in Table 11, the TV Guideline specifies information concerning viewing, such as TV-Y7, TV-PG, and so on, which can be used as keywords. The same goes for Table 12.

TABLE 13

Other keywords

Drug, violence, etc.
→Allowed to age XX and above
Names of programs of which rating levels are known.

Table 13 shows other examples of keywords, such as drug and violence. Age limitation is imposed on programs containing such keywords that are not desirable to children, in addition to programs of which rating levels are known.

TABLE 14

Examples:

| PG-12 | 12 (years of age) |
| R-15 | 15 |
| R-18 | 18 |
| Drug | 15 |
| Violence | 12 |

Keywords may include rating information, as shown in Table 14 in which keywords, such as the aforementioned drug and violence, are associated with viewer age information and stored in a database.

In accordance with the present embodiment, it is determined whether or not any of the text sequences from the database shown in Table. 14 exists in the program information, so as to determine if the viewer age is appropriate.

TABLE 15

TV Guidelines

None
TV-Y
TV-Y7
TV-G
TV-PG
TV-14
TV-MA

TABLE 15-continued

MPAA

N/A
G
PG
PG-13
R
NC-17
X

TABLE 16

| | |
|---|---|
| PG-12 | TV-PG, PG13 |
| R-15 | TV-14, R |
| R-18 | TV-MA, NC-17 |
| TV-Y7 | TV-Y7 |
| TV-PG | TV-PG |
| TV-14 | TV-14 |
| TV-MA | TV-MA |
| MPAA PG | PG |
| PG-13 | PG-13 |
| MPAA R | R |
| NC-17 | NC-17 |
| MPAA X | X |
| Drug | TV-MA |
| Violence | TV-14-V |

TABLE 17

Rating level determination table based on age

| age | TV Guidelines | MPAA |
|---|---|---|
| 0 | None | None |
| 1 | None | None |
| 2 | None | None |
| 3 | TV-Y7 | PG |
| 4 | TV-Y7 | PG |
| 5 | TV-Y7 | PG |
| 6 | TV-Y7 | PG |
| 7 | TV-Y7 | PG |
| 8 | TV-PG | PG |
| 9 | TV-PG | PG |
| 10 | TV-PG | PG |
| 11 | TV-PG | PG |
| 12 | TV-PG | PG-13 |
| 13 | TV-14 | PG-13 |
| 14 | TV-14 | PG-13 |
| 15 | TV-MA | R |
| 16 | TV-MA | R |
| 17 | TV-MA | R |
| 18 | TV-MA | NC-17 |

Table 15 shows the kinds of rating according to TV Guideline and MPAA, which are rating systems of the U.S. While in Japan it is suitable to use a method whereby age is determined from keyword, in the U.S., it is suitable to refer to the rating levels according to Table 15. The ratings are set not by use of age but by use of the kinds of rating. It is determined whether or not any of the text strings shown on the left of Table 16 exists, and whether or not the ratings on the right are appropriate. Table 17 is a table for making a decision based on the U.S. ratings after determining age, as in Japan.

Figure 20:
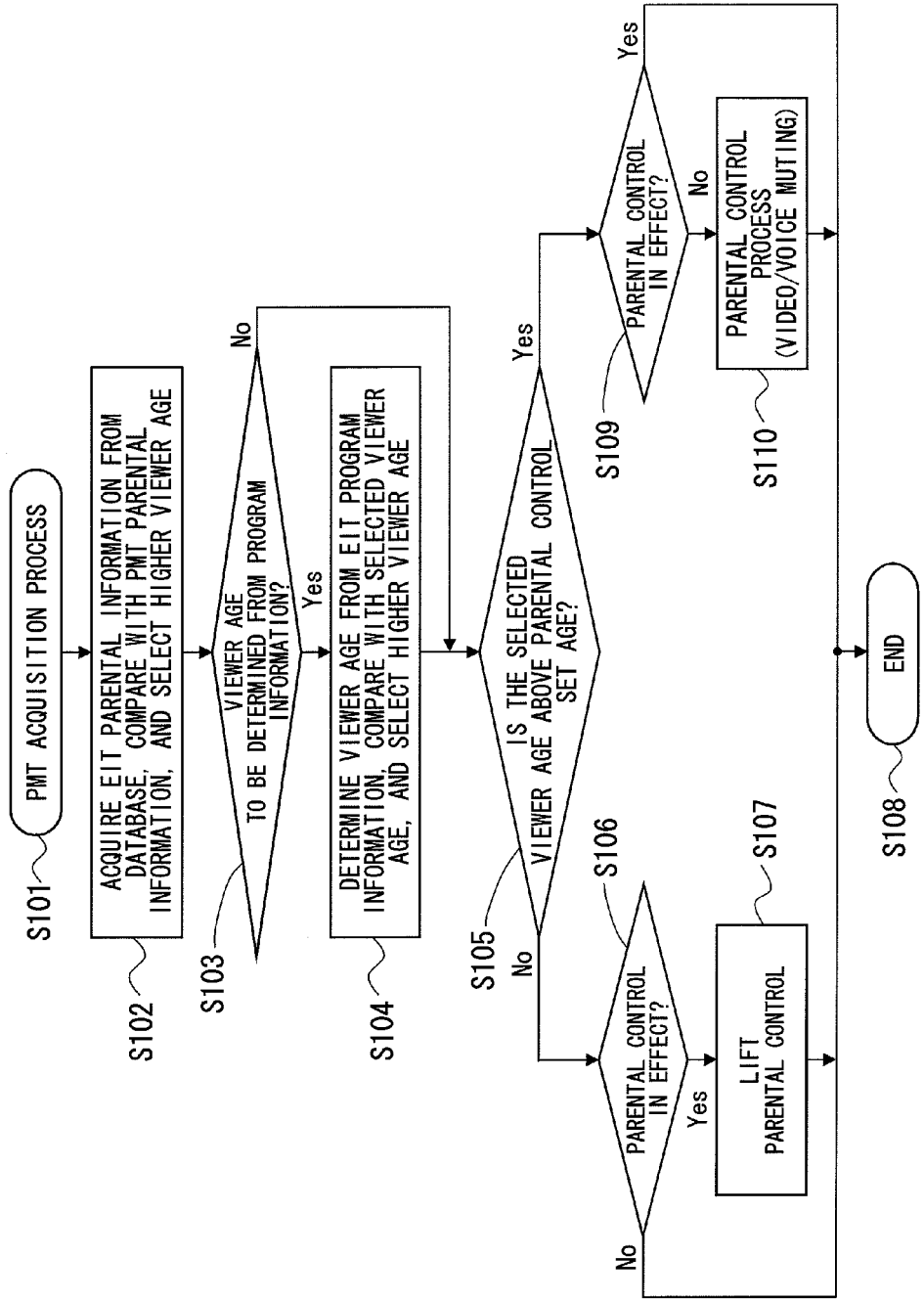
FIG. 20 shows the flow of a parental control related process upon acquisition of PMT in a case where a parental control setting is made on a menu.

Based on the foregoing, the flow of the parental control process according to the present embodiment is described with reference to the drawings. FIG. 20 shows the flow of a parental control related process upon acquisition of PMT in a case where a parental control setting has been made via a menu. As shown in FIG. 20, a PMT acquisition process is carried out in step S101. In step S102, parental information in EIT is acquired from the database, and compared with the parental information in PMT, and the higher viewer age of the two is selected. While parental information is compared between PMT and EIT and the higher age of the two is selected, if no parental information exists, preferably the viewer age is set to zero. As described above, if a parental control setting is in place, it is determined in step S103 whether or not a viewer age determination process is to be made on the basis of the program information (i.e., whether or not the viewer age determination process should be made based on the program information). If the determination process is to be made (Yes), the viewer age is determined in step S104 based on the program information in EIT, and compared with the viewer age selected in step S102, and the higher viewer age of the two is selected. Specifically, the EIT program information is compared with the text strings stored in the database, and if they coincide, the age is determined. If there is no corresponding data, the age is set to zero. If no determination process is to be made in step S103 (No), step S104 is skipped and the process proceeds to step S105.

In step S105, it is determined whether or not the selected viewer age is above the parental control set age set by the user on the menu. If it is (Yes), it can be determined that the new program should not be allowed to be viewed, and so the process proceeds to step S109. If it is not (No), it can be determined that the program may be viewed, so that the process proceeds to step S106. In step S106, it is determined whether or not parental control is placed on the immediately preceding program. If so (Yes), the parental control on the preceding program is lifted in step S107. In this case, the user can view the program.

In step S109, it is determined whether or not parental control is placed on the previous program. If so (Yes), the parental control is maintained (step S108). If not (No), the process proceeds to step S110 where a parental control process, such as a video/audio muting process is carried out. In this case, the user cannot view the program.

Figure 21:
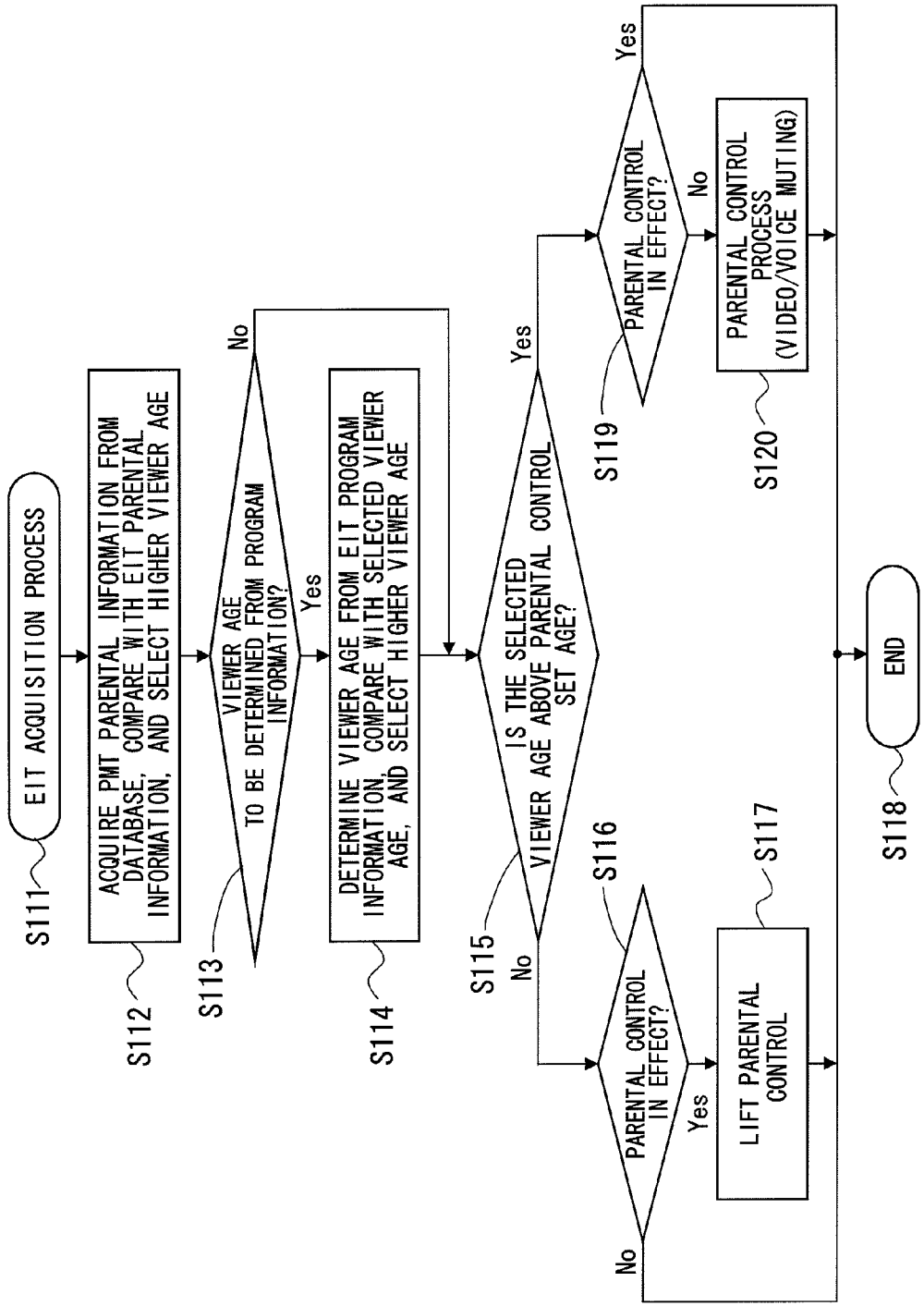
FIG. 21 shows a figure that corresponds to FIG. 20, showing the flow of an EIT acquisition process (step S11).

FIG. 21, which corresponds to FIG. 20, shows the flow of an EIT acquisition process (step S111). In step S112, PMT parental information is acquired from a database, and compared with EIT parental information, and the higher viewer age of the two is selected. The subsequent processes (step S114 to step S118) are basically similar to those shown in FIG. 20.

Figure 22:
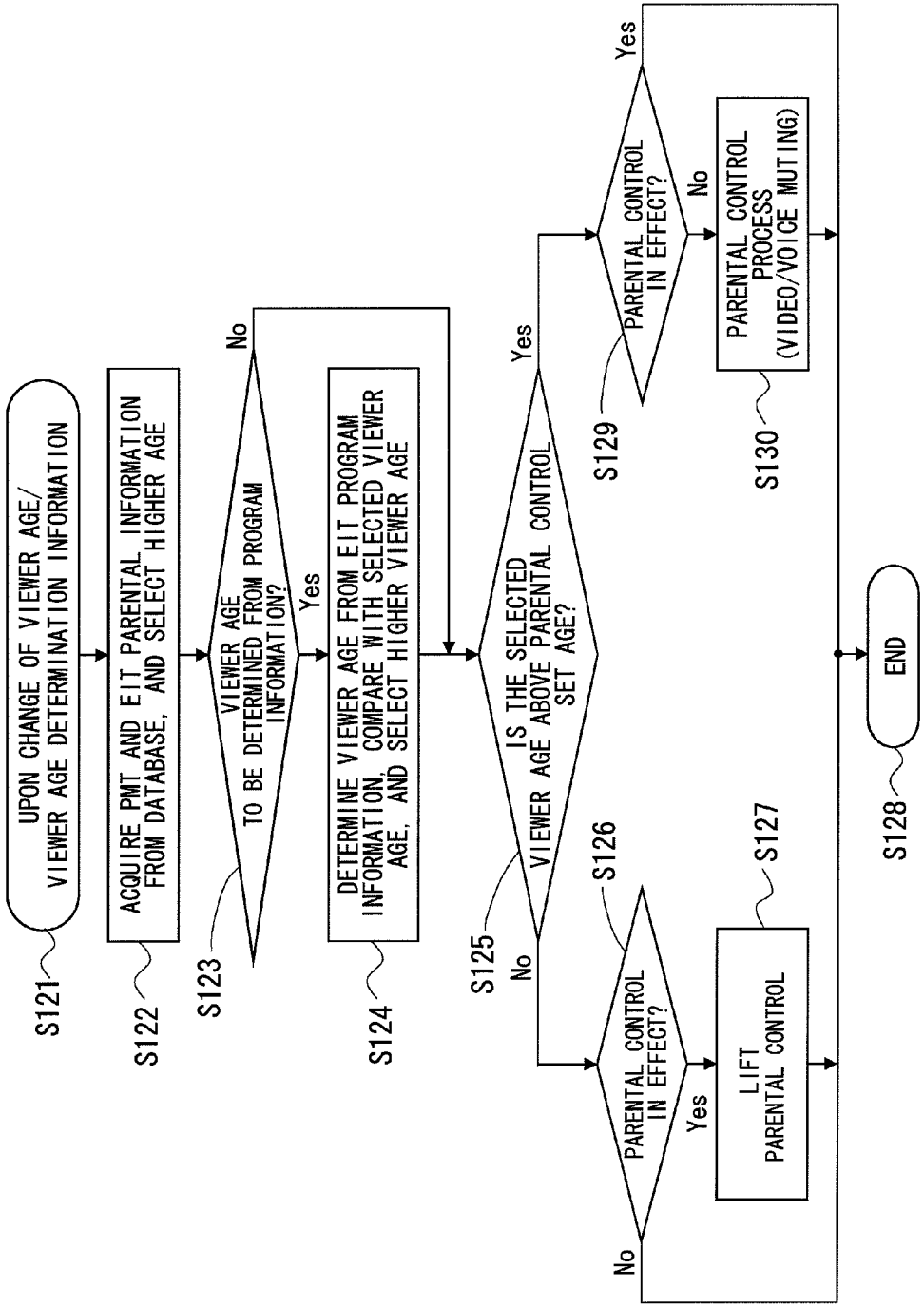
FIG. 22 shows the flow of a process in a case where the parental control setting has been changed upon a change in the viewer age made on the menu.

FIG. 22 shows the flow of a process when the parental control settings are changed by changing the viewer age via the menu. In response to a viewer age change/viewer age determination information changing process in step S121, PMT and EIT parental information is acquired from database in step S122, and the higher viewer age of the two is selected. The subsequent processes are similar to those of FIGS. 20 and 21.

As described above, in accordance with the present embodiment, the viewer age is determined from the program name or program information, and if no parental information exists in a particular program or if the program goes possibly actually above the intended age set in its existing parental information, parental control is imposed if the determined age is set for parental control. Thus, parental control can be imposed without requiring the user to make special settings other than the age setting.

Whether or not the viewer age determined from the program name or program information and the like should be validated can be set on a menu. Preferably, the keywords determined from the program name or program information or the like can be either set by the user or acquired through a download. Whether or not the viewer age determined from the program name or program information or the like should be validated may be set on a menu.

The invention can be applied to various equipments other than television receiving apparatuses, such as recorders, personal computers or portable telephones equipped with TV capabilities, or other content reproducing apparatuses.

INDUSTRIAL APPLICABILITY

The present invention can be applied to television receivers.

What is claimed is:

1. A television receiver capable of imposing parental control on a received program based on a rating that is set, the television receiver comprising:
   a rating information storage unit storing a plurality of types of rating information based on different standards of parental control, each standard including levels corresponding to an approved viewer's age, with levels capable of being commonly set among the plurality of types of rating information being associated with each other;
   a control unit for setting common levels as parental control settings based on the association; and
   an interface configured to display a message indicating that no parental control setting is set in a first standard when the received program exceeds a corresponding level set as a parental control setting in a second standard.

2. The television receiver according to claim 1, comprising a display control unit for adding the common levels as items on a menu display.

3. The television receiver according to claim 2, wherein the common levels are associated with age.

4. The television receiver according to claim 2, wherein the display control unit displays on the menu display a button for setting parental control based on the rating information in a stepwise manner.

5. The television receiver according to claim 3, wherein the display control unit displays on the menu display a button for setting parental control based on the rating information in a stepwise manner.

6. The television receiver according to claim 2, wherein the common levels are associated with a specific text string.

7. The television receiver according to claim 2, wherein the common levels are associated with a numeral string.

8. The television receiver according to claim 1, wherein the interface is further configured to provide a user input concurrently with displaying the message, the user input providing an option to:
   override the parental control setting in the second standard;
   prevent displaying the particular program; and
   set a parental control setting in the first standard.

* * * * *